US010375778B2

(12) United States Patent
Liu et al.

(10) Patent No.: US 10,375,778 B2
(45) Date of Patent: Aug. 6, 2019

(54) SINGLE-SEGMENT LINEAR CONSTANT-POWER LED DRIVING CIRCUIT AND METHOD

(71) Applicant: CHINA RESOURCES POWTECH (SHANGHAI) CO., LTD., Shanghai (CN)

(72) Inventors: Jun Liu, Shanghai (CN); Quanqing Wu, Shanghai (CN); Guocheng Li, Shanghai (CN)

(73) Assignee: CHINA RESOURCES POWTECH (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/755,020

(22) PCT Filed: Dec. 30, 2016

(86) PCT No.: PCT/CN2016/113736
§ 371 (c)(1),
(2) Date: Feb. 23, 2018

(87) PCT Pub. No.: WO2017/219648
PCT Pub. Date: Dec. 28, 2017

(65) Prior Publication Data
US 2019/0124735 A1      Apr. 25, 2019

(30) Foreign Application Priority Data

Jun. 22, 2016   (CN) .......................... 2016 1 0457418

(51) Int. Cl.
*H05B 33/08*         (2006.01)

(52) U.S. Cl.
CPC ....... *H05B 33/0815* (2013.01); *H05B 33/089* (2013.01); *H05B 33/0848* (2013.01)

(58) Field of Classification Search
None
See application file for complete search history.

(56) References Cited

U.S. PATENT DOCUMENTS 6,592,334 B1 *   7/2003   Butler .................. F04B 9/1172
                                                           417/344
9,967,929 B1 *   5/2018   Kuo .................... H05B 33/0812
(Continued)

FOREIGN PATENT DOCUMENTS

CN          202679701 U      1/2013
CN          203399353 U      1/2014

*Primary Examiner* — Jany Richardson
(74) *Attorney, Agent, or Firm* — Global IP Services; Tianhua Gu

(57) ABSTRACT

A single-segment linear constant-power LED driving circuit and method. The circuit comprises: a voltage input module, an LED load, a power switch tube, a sampling resistor, an over-voltage control module for detecting the voltage at a drain terminal of the power switch tube, a current control module for limiting a peak current of the LED load, and a comparison module. When an input voltage is greater than a turn-on voltage of the LED load, the current control module limits the peak current so that the current average value in different input voltage periods is constant. When the input voltage is greater than a set value, current flowing through the LED load is turned off, thereby reducing power consumption. When the input voltage is less than the turn-on voltage of the LED load, the LED load is turned off.

9 Claims, 2 Drawing Sheets

(56) References Cited

U.S. PATENT DOCUMENTS

| | | | |
|---|---|---|---|
| 2011/0085576 A1* | 4/2011 | Crawford | H05B 33/0818 372/38.07 |
| 2014/0265899 A1* | 9/2014 | Sadwick | H05B 33/0812 315/200 R |
| 2015/0137688 A1 | 5/2015 | Gibbs | |

* cited by examiner

SINGLE-SEGMENT LINEAR CONSTANT-POWER LED DRIVING CIRCUIT AND METHOD

TECHNICAL FIELD

The present invention relates to technical field of circuit design, and in particular to a single-segment linear constant-power LED driving circuit and method.

BACKGROUND

LEDs (Light Emitting Diode) are semiconductor electronic components capable of emitting light, and such electronic components can only emit red light having low luminosity in the early stage. With the continuous improvements of technology, the electronic components have been developed to emit visible light, infrared light and ultraviolet light, and there are also great improvements in luminosity. LEDs have advantages that cannot be incomparable by traditional light sources, such as high efficiency, long life, low damage possibility, high switching speed and high reliability, and have been widely used in fields of indicator lights, displays and lighting.

Under normal circumstances, the overall efficiency of a single-segment linear LED driver is determined by a turn-on voltage and an input voltage of an LED, which meets the following relationship:

$$Eff = \frac{V_{LED}}{V_{IN}}$$

FIG. 1 illustrates a common structure of a single-segment linear LED driver, wherein an AC voltage is converted into an input voltage $V_{IN}$ through a rectifier bridge and supplies power for an LED light segment; the LED light segment consists of n LED lights connected in series; an output terminal of the LED segment is connected with a constant current control chip, and the constant current control is realized through the switching of a constant current control transistor in the constant current control chip; a capacitor C and a resistor R are connected in parallel with the two terminals of the input voltage to serve as adjustable devices. Since the number of LEDs connected in series is fixed, the excess voltage when the input voltage exceeds a forward voltage drop is borne by the constant current control transistor connected to the LEDs. $V_{IN}$-$V_{LED}$ is a voltage on an adjusting transistor. The higher the input voltage is, the lower the efficiency of a system will be.

Generally, in a single-segment linear LED driver, an output voltage can be increased by adding the number of LEDs, such that the turn-on voltage of the LED light segment is as close as possible to the input voltage, thereby increasing efficiency. However, it may bring about the problem that the range of the input voltage is relatively narrow, and meanwhile the efficiency is still relatively low in the case of a high input voltage.

In addition, a HIGH-VOLTAGE DROP CURRENT TECHNOLOGY during which the current should be reduced if the voltage is excessively high can be used to reduce the loss caused by a high voltage, but the constant current effect is not good, and efficiency promotion is also limited.

Therefore, how to solve the problem of narrow input voltage range and low efficiency in a single-segment linear LED driver has become one of the problems to be urgently solved by those skilled in the art.

SUMMARY

In view of the above shortcomings of the prior art, an object of the present invention is to provide a single-segment linear constant-power LED driving circuit and method for solving the problem of narrow input voltage range and low efficiency in a single-segment linear LED driver in the prior art.

In order to achieve the above object and other related objects, the present invention provides a single-segment linear constant-power LED driving circuit comprising:

A voltage input module, an LED load, a power switch tube, a sampling resistor, a current control module, a comparison module and an over-voltage control module;

The voltage input module is configured to provide an input voltage;

The LED load is connected to an output terminal of the voltage input module and is powered by the voltage input module;

A drain terminal of the power switch tube is connected to an output terminal of the LED load, and the control of constant current of the LED load is realized by turning on and turning off the power switch tube;

One terminal of the sampling resistor is connected to a source terminal of the power switch tube, and another terminal of the sampling resistor is grounded for sampling and converting the current flowing through the power switch tube into a sampling voltage;

The over-voltage control module is connected to the drain terminal of the power switch tube so as to detect a drain terminal voltage of the power switch tube, and when the voltage at the drain terminal of the power switch tube is greater than a set high voltage, the over-voltage control module outputs a turn-off signal to turn off the current flowing through the LED load;

The current control module is connected to a compensation capacitor, and another terminal of the compensation capacitor is grounded; the current control module receives the sampling voltage and integrates the compensation capacitor to generate a control signal to limit the peak current flowing through the power switch tube, thereby achieving a constant current average value in different input voltage periods; meanwhile, the turn-off signal is received to turn off the current flowing through the LED load when the turn-off signal is enabled, thereby reducing power consumption;

The comparison module is connected to the sampling resistor and the current control module, and compares the sampling voltage with the control signal to generate a switching signal of the power switch tube so as to realize the control of constant current of the LED load.

Preferably, the over-voltage control module comprises a first resistor, a second resistor and an over-voltage detecting unit; one terminal of the first resistor is connected to the drain terminal of the power switch tube, and another terminal of the first resistor is connected to the second resistor and is then grounded, the first resistor and the second resistor detect the voltage at the drain terminal of the power switch tube and output a detected voltage; and the over-voltage detecting unit is connected between the first resistor and the second resistor, and the turn-off signal is generated according to the detected voltage.

More preferably, the over-voltage control module further comprises a constant current source, one terminal of the constant current source is connected between the first resistor and the second resistor, and another terminal of the constant current source is grounded; a turn-off slope of the current flowing through the LED load is adjusted through the first resistor, the second resistor and the constant current source.

Preferably, the single-segment linear constant-power LED driving circuit further comprises a circuit for generating operating voltages, wherein the circuit for generating operating voltages provides an operating voltage for each module; one terminal of the circuit for generating operating voltages is connected to the output terminal of the voltage input module, and another terminal of the circuit for generating operating voltages is grounded through an energy storage capacitor.

In order to achieve the above object and other related objects, the present invention provides a method for driving the single-segment linear constant-power LED driving circuit as stated above, and the method for driving the single-segment linear constant-power LED at least comprises the following steps:

Turning on the power switch tube, wherein when an input voltage is greater than a turn-on voltage of the LED load, the LED load is turned on, and current flows through the LED load and the power switch tube; the current control module receives a sampling voltage and integrates the compensation capacitor to obtain a control signal; the control signal controls the power switch tube to limit a peak current flowing through the LED load so as to obtain a constant current average value in different input voltage periods;

The input voltage continues to increase, and when the voltage at the drain terminal of the power switch tube is greater than a set high voltage, the over-voltage control module outputs a turn-off signal to turn off the current flowing through the LED load, thereby reducing power consumption;

Then the input voltage drops; when the voltage at the drain terminal of the power switch tube is less than the set high voltage, the turn-off signal is disabled, current flows through the LED load and the power switch tube, and a current average value is kept constant in different input voltage periods; and The input voltage continues to drop, and when the input voltage is less than the turn-on voltage of the LED load, the LED load is turned off, and no current flows through the LED load and the power switch tube.

Preferably, the turn-off slope of the current flowing through the LED load is set by setting a dropping point and a turn-off point of the current flowing through the LED load, thereby reducing electromagnetic interference.

More preferably, the voltage at the drain terminal of the power switch tube is detected; when the detected voltage is greater than zero, the current flowing through the LED load begins to drop; when the detected voltage is greater than a reference voltage, the current flowing through the LED load is turned off.

More preferably, when the detected voltage is greater than zero, the voltage at the drain terminal of the power switch tube is $I1*R1$, wherein $I1$ refers to constant current of the constant current source, and $R1$ refers to a resistance of the first resistor.

More preferably, when the detected voltage is greater than the reference voltage, the voltage at the drain terminal of the power switch tube is $(Vref/R2+I1)*(R1+R2)$, wherein $Vref$ refers to the reference voltage, $I1$ refers to constant current of the constant current source, $R1$ refers to a resistance of the first resistor, and $R2$ refers to a resistance of the second resistor.

As described above, the single-segment linear constant-power LED driving circuit and method provided in the present invention have the following beneficial effects:

1. According to the single-segment linear constant-power LED driving circuit and method provided in the present invention, the average current in an AC period is controlled by the compensation capacitor and the peak current is limited to realize the constant power output in a wide range of input voltage.

2. According to the single-segment linear constant-power LED driving circuit and method provided in the present invention, the turn-off voltage of an LED is adjusted by an external resistor, and the LED is turned off to achieve high efficiency of the system when the input voltage is relatively high.

3. According to the single-segment linear constant-power LED driving circuit and method provided in the present invention, the turn-off slope of the LED is adjusted through an external resistor to achieve the linear turn-off of the LED current and optimize the electromagnetic interference performance of the system.

4. According to the single-segment linear constant-power LED driving circuit and method provided in the present invention, due to achievement of high efficiency, the entire system can be highly integrated to achieve the simplest peripheral circuit.

DESCRIPTIONS OF COMPONENT REFERENCES

Figure 1:
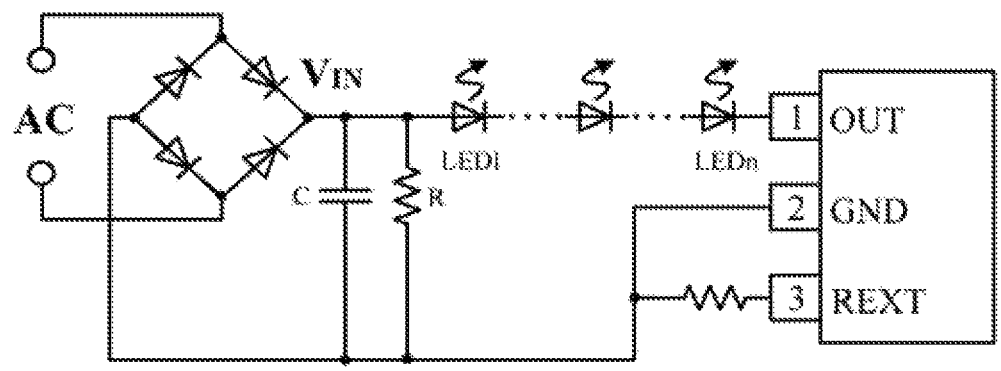
FIG. 1 shows a schematic structural diagram of a single-segment linear LED driver in the prior art.

1 Single-segment linear constant-power LED driving circuit
11 Voltage input module
12 LED load
13 Current control module
14 Comparison module
15 Over-voltage control module
151 Over-voltage detecting unit
16 Circuit for generating operating voltage

DETAILED DESCRIPTION OF THE PREFERRED EMBODIMENTS

The implementation modes of the present invention will be described below through specific examples. One skilled in the art can easily understand other advantages and effects of the present invention according to content disclosed in the description. The present invention may also be implemented or applied through other different specific implementation modes. Various modifications or variations may be made to all details in the description based on different points of view and applications without departing from the spirit of the present invention.

Figure 2:
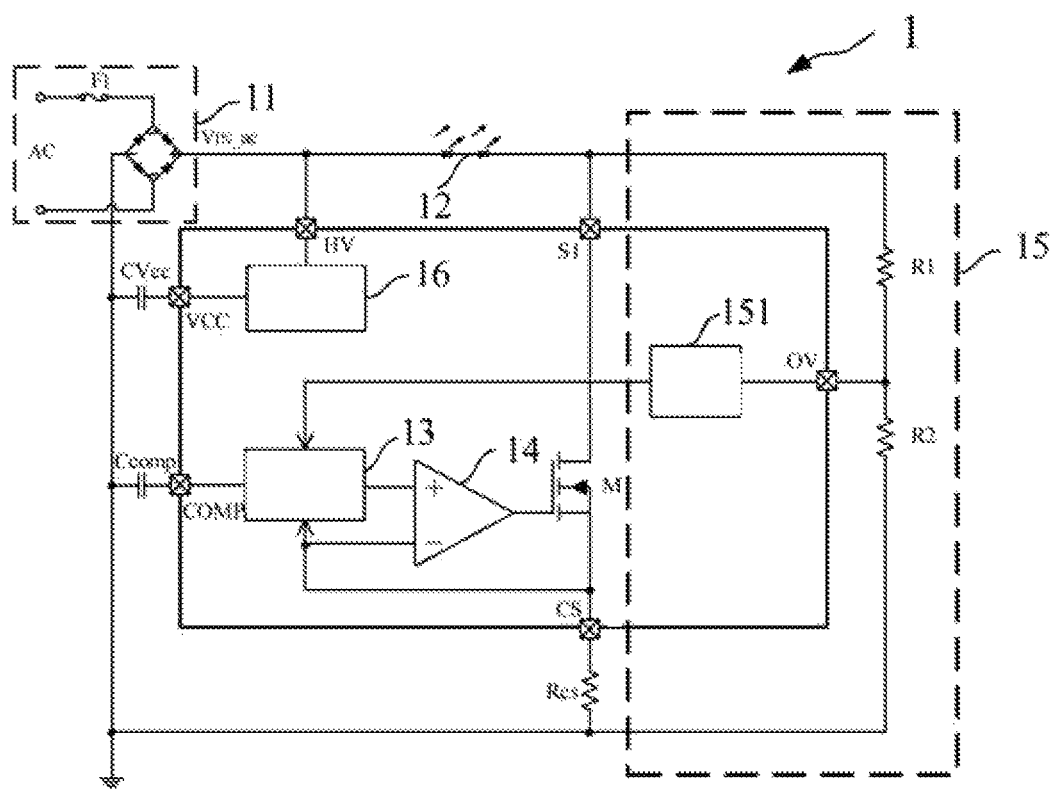
FIG. 2 shows a schematic diagram of an embodiment of a single-segment linear constant-power LED driving circuit according to the present invention.
Figure 3:
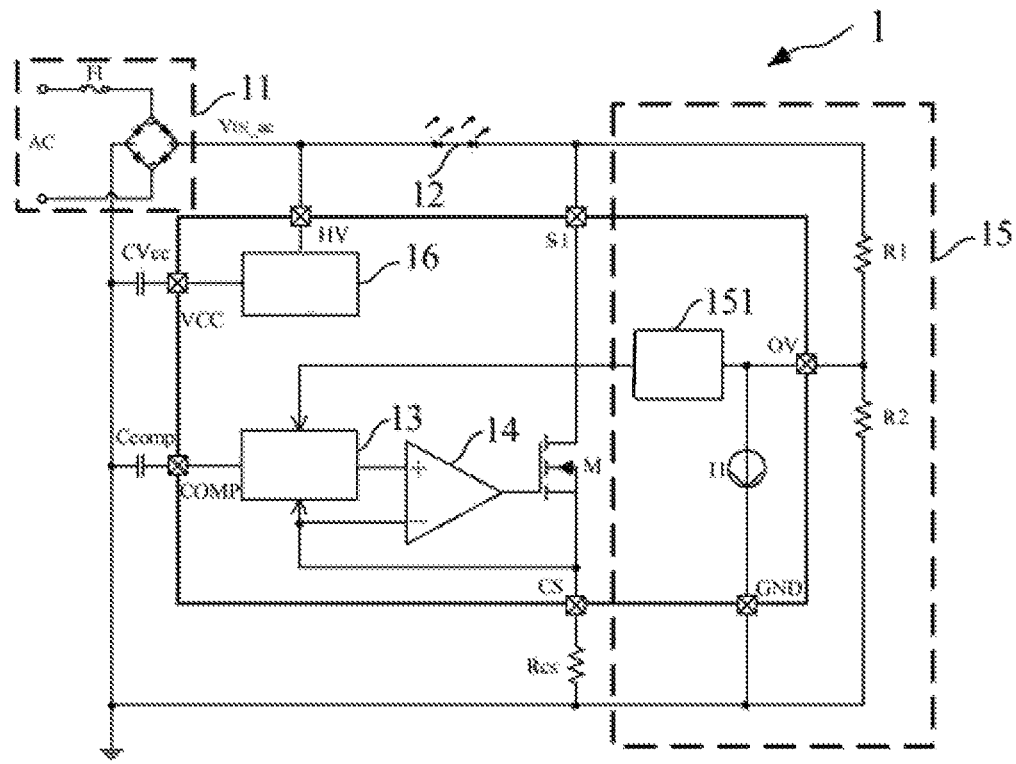
FIG. 3 shows a schematic diagram of another embodiment of the single-segment linear constant-power LED driving circuit according to the present invention.
Figure 4:
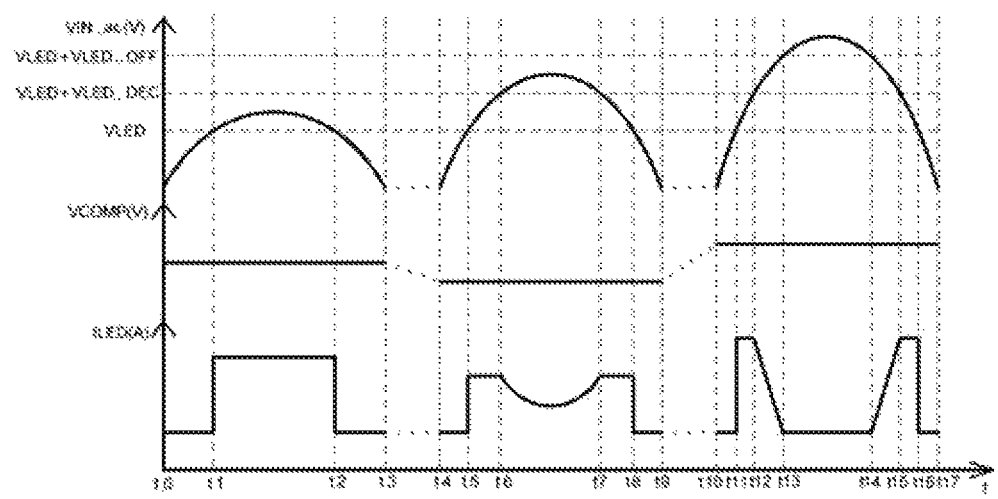
FIG. 4 shows a schematic diagram of the working principle of the single-segment linear constant-power LED driving circuit according to the present invention.

Reference is made to FIGS. 2-4. It should be noted that, the figures provided in present embodiments merely illustrate the basic concept of the present invention in a schematic manner, and therefore the figures only illustrate the components related to the present invention but are not drafted according to the numbers, shapes and sizes of components in actual implementation, the types, quantity and ratios of components can be a random change, and its component layout pattern may also be more complex.

Embodiment 1

As shown in FIG. 2, the present invention provides a single-segment linear constant-power LED driving circuit 1, at least including:

a voltage input module 11, an LED load 12, a power switch tube M, a sampling resistor $R_{CS}$, a current control module 13, a comparison module 14, an over-voltage control module 15 and a circuit for generating operating voltages 16.

As shown in FIG. 2, the voltage input module 11 is configured to provide an input voltage $V_{IN\_}$ac.

Specifically, as shown in FIG. 2, the voltage input module 11 is an off-chip device and includes an alternating current power supply AC, a fuse F1 and a rectifying unit. The rectifying unit includes two groups of diodes connected in parallel. Each group of diodes includes two diodes connected in series. The alternating current power supply AC is connected between two diodes in each group via the fuse F1. The voltage input module 11 provides the input voltage $V_{IN\_}$ac, and the input voltage $V_{IN\_}$ac is a rectified voltage rectified by a sinusoidal voltage that is continuously increased or decreased.

As shown in FIG. 2, the LED load 12 is connected to an output terminal of the voltage input module 11 and is powered by the voltage input module 11.

Specifically, as shown in FIG. 2, the LED load 12 is an off-chip device and includes a plurality of LED lights connected in series. The LED load 12 may also be a structure with a plurality of LED lights connected in parallel and in series, which is not limited to this embodiment. The voltage input module 11 supplies power to the LED load 12. When Voltages between both terminals of the LED load 12 reach its turn-on voltage, the LEDs in the LED load 12 light up to achieve a lighting effect.

As shown in FIG. 2, a drain terminal of the power switch tube M is connected to an output terminal of the LED load 12, and the control of constant current of the LED load 12 is realized by turning on and turning off of the power switch tube M.

Specifically, as shown in FIG. 2, in this embodiment, the power switch tube M is an N-type MOS transistor. In actual use, the type of the power switch tube is not limited thereto. The power switch tube M is an on-chip device, and the drain terminal of the power switch tube M is connected with an off-chip device through an S1 terminal.

As shown in FIG. 2, one terminal of the sampling resistor $R_{CS}$ is connected to a source terminal of the power switch tube M, and another terminal of the sampling resistor $R_{CS}$ is grounded for sampling the current flowing through the power switch tube M and converting it into a sampling voltage $V_{CS}$.

Specifically, as shown in FIG. 2, the sampling resistor $R_{CS}$ is an off-chip device and is connected to the source terminal of the power switch tube M inside a chip through a CS terminal.

As shown in FIG. 2, the over-voltage control module 15 is connected to the drain terminal of the power switch tube M to detect the drain terminal voltage Vs1 of the power switch tube M. When the drain terminal voltage of the power switch tube M is greater than a set high voltage, the over-voltage control module 15 outputs a turn-off signal to turn off the current flowing through the LED load 12, thereby reducing the power consumption. In this embodiment, when the drain terminal voltage Vs1 of the power switch tube M reaches the set high voltage, the input voltage $V_{IN\_}$ac is greater than the operating voltage of the LED load 12. Those skilled in the art can understand that: as the input voltage $V_{IN\_}$ac increases, the LED load 12 is gradually turned on and the voltages between both terminals are stabilized at the operating voltage; as the input voltage $V_{IN\_}$ac continues to increase, the excess voltage is bore by the power switch tube M, which inevitably leads to inefficiency. Therefore, those skilled in the art can set the set high voltage for turning off the current flowing through the LED load 12 according to requirements of different operating current and operating voltage, and the specific values thereof are not limited one by one.

Specifically, as shown in FIG. 2, the over-voltage control module 15 includes a first resistor R1, a second resistor R2 and an over-voltage detecting unit 151. In this embodiment, the first resistor R1 and the second resistor R2 are off-chip devices, and the over-voltage detecting unit 151 is an on-chip device. One terminal of the first resistor R1 is connected to the drain terminal S1 of the power switch tube M, and another terminal of the first resistor R1 is connected to the second resistor R2 and is then grounded; and the drain terminal voltage Vs1 of the power switch tube M is detected through the voltage division of the first resistor R1 and the second resistor R2, and a detected voltage $V_{OV}$ is therefore obtained. The over-voltage detecting unit 151 is connected between the first resistor R1 and the second resistor R2 to compare the detected voltage $V_{OV}$ with an internal reference voltage (the reference voltage is obtained by dividing the set high voltage through the first resistor R1 and the second resistor R2) to further obtain the turn-off signal and act on the current control module 13. The detected voltage $V_{OV}$ reflects the drain terminal voltage Vs1 of the power switch tube M. When the drain terminal voltage Vs1 of the power switch tube M is greater than the set high voltage, the detected voltage $V_{OV}$ is greater than the reference voltage in the over-voltage detecting unit 151, and the turn-off signal output by the over-voltage detecting unit 151 is enabled to further control the current control module 13 to turn off the current flowing through the LED load 12 to reduce the power consumption, thereby achieving the high efficiency of the system. The first resistor R1 and the second resistor R2 are off-chip devices. The turn-off point of the current flowing through the LED load 12 can be changed by changing the values of the first resistor R1 and the second resistor R2, thus greatly improving the flexibility.

As shown in FIG. 2, the current control module 13 is connected to a compensation capacitor Ccomp, and another terminal of the compensation capacitor Ccomp is grounded; the current control module receives the sampling voltage $V_{CS}$ and integrates the compensation capacitor Ccomp to generate a control signal to limit a peak current flowing through the power switch tube M, thereby achieving a constant current average value in different input voltage $V_{IN\_}$ac periods; meanwhile, the turn-off signal is received; and when the turn-off signal is enabled, the current flowing through the LED load is turned off, thereby reducing the power consumption.

Specifically, as shown in FIG. 2, the current control module 13 is an on-chip device and is connected to the sampling resistor $R_{CS}$ and a compensation capacitor Ccomp. The compensation capacitor Ccomp is an off-chip device, and the compensation capacitor is connected with the current control module 13 through a COMP terminal. The current control module 13 generates a control signal to respond to the integral of the compensation capacitor Ccomp, and the voltage on the compensation capacitor Ccomp determines the peak current flowing through the LED load 12. Through the integral of the compensation capacitor Ccomp, the current average value is constant in different input voltage periods, such that the constant power output in a wide range of input voltage is realized. Moreover, the current control module 13 receives the turn-off signal output by the over-voltage control module 15; the control signal is not affected when the turn-off signal is disabled; when the turn-off signal is enabled, the control signal is adjusted to turn off the power switch tube M. In this embodiment, the output signal of the comparison module 14 is inverted by decreasing the control signal to further turn off the power switch tube M.

As shown in FIG. 2, the comparison module 14 is connected to the sampling resistor $R_{CS}$ and the current control module 13 to compare the sampling voltage $V_{CS}$ with the control signal so as to generate a switching signal of the power switch tube M, thereby realizing the control of the constant current of the LED load 12.

Specifically, as shown in FIG. 2, the comparison module 14 is an on-chip device. In this embodiment, the comparison module 14 is a comparator, and a positive input terminal of the comparator is connected to the current control module 13, and a negative input terminal of the comparator is connected to the sampling resistor $R_{CS}$; when the sampling voltage $V_{CS}$ is greater than the control signal, the comparator outputs a low level to turn off the power switch tube M so as to reduce the current flowing through the LED load 12; when the sampling voltage $V_{CS}$ is less than the control signal, the comparator outputs a high level to turn on the power switch tube M so as to increase the current flowing through the LED load 12. The control of the constant current of the LED load 12 is realized by turning on and turning off the power switch tube M.

As shown in FIG. 2, the single-segment linear constant-power LED driving circuit 1 further includes a circuit for generating operating voltages 16 providing an operating voltage for each module.

Specifically, as shown in FIG. 2, the circuit for generating operating voltages 16 is an on-chip device, one terminal of the circuit for generating operating voltages 16 is connected to the output terminal of the voltage input module 11 through an HV terminal, electric energy is obtained from the voltage input module 11, and the another terminal of the circuit for generating operating voltages 16 is connected to an off-chip energy storage capacitor $C_{VCC}$ through a $V_{CC}$ terminal and is then grounded. The circuit for generating operating voltages 16 saves the generated voltage $V_{CC}$ on the energy storage capacitor $C_{VCC}$ to ensure that there is still enough energy to maintain the operation of each module even though the input voltage $V_{IN\_}$ac is at the bottom.

Embodiment 2

As shown in FIG. 3, the present invention provides a single-segment linear constant-power LED driving circuit having a structure basically the same as that in the first embodiment, except that the over-voltage control module 15 further includes a constant current source I1 to adjust the turn-off slope of the current flowing through the LED load 12, thereby reducing electromagnetic interference and optimizing circuit performance.

Specifically, as shown in FIG. 3, the over-voltage control module 15 includes a first resistor R1, a second resistor R2, a constant current source I1, and an over-voltage detecting unit 151. In this embodiment, the first resistor R1 and the second resistor R2 are off-chip devices, and the constant current source I1 and the over-voltage detecting unit 151 are in-chip devices. One terminal of the first resistor R1 is connected to a drain terminal S1 of the power switch tube M, and another terminal of the first resistor R1 is connected to the second resistor R2 and is then grounded. One terminal of the constant current source I1 is connected between the first resistor R1 and the second resistor R2, and another terminal of the constant current source I1 is grounded. The drain terminal voltage Vs1 of the power switch tube M is detected by the first resistor R1, the second resistor R2 and the constant current source I1 to obtain a detected voltage $V_{OV}$. In order to reduce the electromagnetic interference, two points of the voltage at the drain terminal Vs1 of the power switch tube M are detected by the first resistor R1, the second resistor R2 and the constant current source I1, and the two points thereof are respectively used as a dropping point and a turn-off point of the current flowing through the LED load 12. In this embodiment, when the drain terminal voltage Vs1 of the power switch tube M is set as VLED_DEC, the current begins to flow through the over-voltage control module 15, the detected voltage $V_{OV}$ begins to rise from zero, and the turn-off signal begins to take effect, the amplitude of the turn-off signal is related to the detected voltage $V_{OV}$, and the current control module 13 is controlled to adjust the control signal to start reducing the current flowing through the LED load 12; when the drain terminal voltage Vs1 of the power switch tube M is set as VLED_OFF, the detected voltage $V_{OV}$ reaches a reference voltage Vref inside the over-voltage detecting unit 151, and the turn-off signal controls the current control module 13 to adjust the control signal to completely turn off the current flowing through the LED load 12. In this embodiment, VLED-DEC is set as I1*R1 and VLED-OFF is set as (Vref/R2+I1)*(R1+R2), where I1 refers to a constant current of the constant current source I1, R1 refers to a resistance of the first resistor R1, R2 refers to a resistance of the second resistor R2, and Vref refers to a reference voltage inside the over-voltage detecting unit 151. The dropping point and the turn-off point of the current flowing through the LED load 12 can be changed by changing the values of the first resistor R1, the second resistor R2 and the constant current source I1, thus greatly improving the flexibility; and the specific values thereof can be set specifically according to the system application environment and are not limited herein one by one. The dropping point and the turn-off point determine the turn-off slope of the current flowing through the LED load 12. The slope can be set specifically according to a specific circuit. By linearly turning off the current flowing through the LED load 12, the loss generated when high voltage is input can be effectively reduced, and therefore the system efficiency and the ability to resist electromagnetic interference can be improved.

As shown in FIGS. 2-4, the working principle of the single-segment linear constant-power LED driving circuit 1 is as follows:

The power switch tube M is turned on, and when an input voltage $V_{IN\_}ac$ is greater than a turn-on voltage of the LED load 12, the LED load 12 is turned on, and the current flows through the LED load 12 and the power switch tube M; the current control module 13 receives a sampling voltage $V_{CS}$ and integrates the compensation capacitor Ccomp to generate a control signal, wherein the control signal controls the power switch tube M to limit a peak current flowing through the LED load 12 so as to achieve a constant current average value during different input voltage periods, thereby realizing constant power output in a wide range of input voltage;

The input voltage $V_{IN\_}ac$ continuous to increase, and when a drain terminal voltage $V_{S1}$ of the power switch tube M is greater than a set high voltage, the over-voltage control module 15 outputs a turn-off signal to turn off the current flowing through the LED load 12, thereby reducing power consumption;

Then the input voltage $V_{IN\_}ac$ drops; when the drain terminal voltage $V_{S1}$ of the power switch tube M is less than the set high voltage, the turn-off signal is disabled, a current flows through the LED load 12 and the power switch tube M, and a current average value is kept constant during different input voltage periods;

The input voltage $V_{IN\_}ac$ continues to drop, and when the input voltage $V_{IN\_}ac$ is less than the turn-on voltage of the LED load 12, the LED load 12 is turned off, and no current flows through the LED load 12 and the power switch tube M.

In this embodiment, when the drain terminal voltage $V_{S1}$ of the power switch tube M reaches the set high voltage, the input voltage $V_{IN\_}ac$ is greater than the operating voltage of the LED load 12. Those skilled in the art can understand that as the input voltage $V_{IN\_}ac$ increases, the LED load 12 is gradually turned on, and the voltages between both terminals are stabilized at the operating voltage; as the input voltage $V_{IN\_}ac$ continues to increase, the excess voltage is bore by the power switch tube M, which inevitably leads to inefficiency. Therefore, those skilled in the art can set the set high voltage for turning off the current flowing through the LED load 12 according to requirements of different operating current and operating voltages, and the specific values are not limited one by one. The drain terminal voltage $V_{S1}$ of the power switch tube M is detected through the over-voltage control module 15, and in the case of a high input voltage, the loss is reduced and the system efficiency is improved.

Further, in order to optimize the electromagnetic interference resistance of the system, the current flowing through the LED load 12 is linearly turned off.

Specifically, the turn-off slope of the current flowing through the LED load is set by setting a dropping point and a turn-off point of the current flowing through the LED load, thereby reducing electromagnetic interference.

In this embodiment, corresponding to the dropping point of the current flowing through the LED load 12, the drain terminal voltage $V_{S1}$ of the power switch tube M is set as VLED_DEC=I1*R1, where I1 refers to the constant current of the constant current source, and R1 refers to a resistance of the first resistor; the detected voltage $V_{OV}$ begins to rise from zero, and the current flowing through the LED load 12 begins to drop. Corresponding to the turn-off point of the current flowing through the LED load 12, the drain terminal voltage Vs1 of the power switch tube M is set as VLED_OFF=(Vref/R2+I1)*(R1+R2), where I1 is the constant current of the constant current source, R1 refers to a resistance of the first resistor, R2 refers to a resistance of the second resistor, and Vref refers to a reference voltage inside the over-voltage detecting unit 151; when the detected voltage $V_{OV}$ reaches the reference voltage Vref, the current flowing through the LED load 12 is completely turned off.

As shown in FIG. 4, during different input voltage periods, the average values of the currents flowing through the LED load 12 are the same. The specific working process is as follows:

At time t0, $V_{IN\_}ac$<VLED (VLED is a turn-on voltage of the LED load 12), the LED load 12 is not turned on, and no current flows through the LED load 12; at the beginning of time t1, $V_{IN\_}ac$>VLED, the LED load 12 begins to be turned on, the peak current flowing through the LED load 12 is determined by a voltage VCOMP on the compensation capacitor Ccomp; before time t2, $V_{IN\_}ac$<VLED+VLED_DEC, so the current flowing through the LED load 12 remains constant; after the time t2, $V_{IN\_}ac$<VLED, the LED load 12 is turned off again till time t3, and then the period ends. The average current of the LED load during the period of t0-t3 is maintained at a set value.

At time t4, another AC period with different input voltage amplitude begins; before time t5, $V_{IN\_}ac$<VLED, and the LED load 12 is turned off before time t6, $V_{IN\_}ac$<=VLED+VLED_DEC, and in this case, the LED load 12 is turned on, the peak current flowing through the LED load 12 is determined by the voltage VCOMP on the compensation capacitor Ccomp and remains constant; before time t7, VLED+VLED_DEC<$V_{IN\_}ac$<VLED+VLED_OFF, and in this case, the current flowing through the load 12 varies with the voltage change of the input voltage $V_{IN\_}ac$ and is inversely proportional to the input voltage $V_{IN\_}ac$; that is, the current flowing through the LED load 12 drops with the increase of the input voltage V ac; before time t8, VLED+VLED_DEC>$V_{IN\_}ac$>VLED, the current flowing through the LED load 12 is clamped by the voltage VCOMP on the compensation capacitor Ccomp. A period ends at time t9, the average current in this period is the same as the average current in the period of t0-t3. This is done by integrating the compensation capacitor Ccomp.

At time t10, another period begins; at time t11, $V_{IN\_}ac$=VLED; before the time t11, the LED load 12 is turned off and the current is zero; after the time t11, the LED load 12 is turned on and the current is determined by the voltage VCOMP on the compensation capacitor Ccomp; at time t12, $V_{IN\_}ac$=VLED+VLED_DEC, the current begins to drop linearly; at time t13, $V_{IN\_}ac$=VLED+VLED_OFF, and the current drops to zero; before time t14, $V_{IN\_}ac$ is always greater than VLED+VLED_OFF, the LED load 12 is always turned off; till the beginning of time t14, VLED+VLED_DEC<$V_{IN\_}ac$<VLED+VLED_OFF, the current flowing through the LED load 12 linearly increases; after time t15, $V_{IN\_}ac$<VLED+VLED_DEC, the current flowing through the LED load 12 is clamped and controlled by the voltage VCOMP on the compensation capacitor Ccomp; after time t16, $V_{IN\_}ac$<VLED, the LED load 12 is not turned on any longer, the current drops to zero, and one period ends at time t17. Similarly, the average current of the LED in the period of t10-t17 is consistent with those in the previous two periods.

According to the present invention, the current flowing through the LED load is turned off at a high input voltage to reduce the loss on the power switch tube M and improve the overall efficiency; furthermore, the dropping point and the turn-off point of the current are set for reducing the electromagnetic interference, thereby adjusting the turn-off slope. Meanwhile, due to the integration of the compensation capacitor Ccomp, the average current in the entire period can be kept consistent, so as to realize the constant power output in a wide input voltage range.

Taking an actual imitating and simulation case as an example, the output LED load is 250V, the variation rate of the output current is less than 1%, and the system efficiency is greater than 85% in the range of input voltage of 200Vac-264Vac.

As described above, the single-segment linear constant-power LED driving circuit and method provided in the present invention have the following beneficial effects:

1. According to the single-segment linear constant-power LED driving circuit and method provided in the present invention, the average current in an AC period is controlled by the compensation capacitor, and the peak current is limited to realize the constant power output in a wide range of input voltage.

2. According to the single-segment linear constant-power LED driving circuit and method provided in the present invention, the turn-off voltage of an LED is adjusted by an external resistor, and the LED is turned off to achieve high efficiency of the system when the input voltage is relatively high.

3. According to the single-segment linear constant-power LED driving circuit and method provided in the present invention, the turn-off slope of the LED is adjusted through an external resistor to achieve the linear turn-off of the current of the LED and optimize the electromagnetic interference performance of the system.

4. According to the single-segment linear constant-power LED driving circuit and method provided in the present invention, due to achievement of high efficiency, the entire system can be highly integrated to achieve the simplest peripheral circuit.

To sum up, the present invention provides a single-segment linear constant-power LED driving circuit and method. The single-segment linear constant-power LED driving circuit includes a voltage input module, an LED load, a power switch tube, a sampling resistor, a current control module, a comparison module and an over-voltage control module; the voltage input module supplies power to the LED load; the control of constant current of the LED load is realized by turning on and turning off the power switch tube; the sampling resistor feeds back a sampling voltage; and the over-voltage control module detects a drain terminal voltage of the power switch tube, and when the drain terminal voltage of the power switch tube is greater than a set high voltage, the over-voltage control module outputs a turn-off signal to turn off the current flowing through the LED load; the current control module receives the sampling voltage and integrates a compensation capacitor to generate a control signal to limit a peak current flowing through the power switch tube so as to achieve a constant current average value in different input voltage periods; meanwhile, the turn-off signal is received, the current flowing through the LED load is turned off when the turn-off signal is enabled, so as to reduce the power consumption; and the comparison module generates a switching signal of the power switch tube, so as to realize the control of constant current of the LED load. The power switch tube is turned on, and when an input voltage is greater than a turn-on voltage of the LED load, the LED load is turned on, and the current flows through the LED load and the power switch tube; the current control module receives a sampling voltage and integrates the compensation capacitor to generate a control signal, wherein the control signal controls the power switch tube to limit a peak current flowing through the LED load so as to achieve a constant current average value in different input voltage periods; the input voltage continuous to increase, and when the voltage at the drain terminal of the power switch tube is greater than a set high voltage, the over-voltage control module outputs a turn-off signal to turn off the current flowing through the LED load, thereby reducing power consumption; and then the input voltage drops; when the voltage at the drain terminal of the power switch tube is less than the set high voltage, the turn-off signal is disabled, a current flows through the LED load and the power switch tube, and a current average value is kept constant in different input voltage periods; the input voltage continues to drop, and when the input voltage is less than the turn-on voltage of the LED load, the LED load is turned off, and no current flows through the LED load and the power switch tube. According to the single-segment linear constant-power LED driving circuit and method provided in the present invention, the average current in an AC period is controlled by the compensation capacitor, and the peak current is limited to realize the constant power output in a wide range of input voltage; the turn-off voltage of an LED is adjusted by an external resistor, and the LED is turned off to achieve high efficiency of the system when the input voltage is relatively high; the turn-off slope of the LED is adjusted through an external resistor to achieve the linear turn-off of the LED current and optimize the electromagnetic interference performance of the system; and moreover, due to achievement of high efficiency, the entire system can be highly integrated to achieve the simplest peripheral circuit. Therefore, the present invention effectively overcomes various disadvantages of the prior art and has a high value in industrial use.

The above-mentioned embodiments merely illustrate the principle of the present invention and its efficacy, but are not intended to limit the present invention. Any person skilled in the art can make modifications or changes to the above-mentioned embodiments without departing from the spirit and scope of the present invention. Therefore, all equivalent modifications or changes made by those skilled in the art without departing from the spirit and technical concepts disclosed in the present invention should still be covered by the claims of the present invention.

What is claimed is:

1. A single-segment linear constant-power LED driving circuit, characterized in that the single-segment linear constant-power LED driving circuit at least comprises:
a voltage input module, an LED load, a power switch tube, a sampling resistor, a current control module, a comparison module and an over-voltage control module; wherein
the voltage input module is configured to provide an input voltage;
the LED load is connected to an output terminal of the voltage input module and is powered by the voltage input module;
a drain terminal of the power switch tube is connected to an output terminal of the LED load, and the control of constant current of the LED load is realized by turning on and turning off the power switch tube;
one terminal of the sampling resistor is connected to a source terminal of the power switch tube, and another terminal of the sampling resistor is grounded for sampling and converting the current flowing through the power switch tube into a sampling voltage;
the over-voltage control module is connected to the drain terminal of the power switch tube so as to detect a drain terminal voltage of the power switch tube, and when the voltage at the drain terminal of the power switch tube is greater than a set high voltage, the over-voltage control module outputs a turn-off signal to turn off the current flowing through the LED load;

the current control module is connected to a compensation capacitor, and another terminal of the compensation capacitor is grounded; the current control module receives the sampling voltage and integrates the compensation capacitor to generate a control signal to limit the peak current flowing through the power switch tube, thereby achieving a constant current average value in different input voltage periods; meanwhile, the turn-off signal is received to turn off the current flowing through the LED load when the turn-off signal is enabled, thereby reducing power consumption;

the comparison module is connected to the sampling resistor and the current control module, and compares the sampling voltage with the control signal to generate a switching signal of the power switch tube so as to realize the control of constant current of the LED load.

2. The single-segment linear constant-power LED driving circuit according to claim 1, characterized in that the over-voltage control module comprises a first resistor, a second resistor and an over-voltage detecting unit; one terminal of the first resistor is connected to the drain terminal of the power switch tube, and another terminal of the first resistor is connected to the second resistor and is then grounded, the first resistor and the second resistor detect the voltage at the drain terminal of the power switch tube and output a detected voltage; and the over-voltage detecting unit is connected between the first resistor and the second resistor, and the turn-off signal is generated according to the detected voltage.

3. The single-segment linear constant-power LED driving circuit according to claim 2, characterized in that the over-voltage control module further comprises a constant current source, one terminal of the constant current source is connected between the first resistor and the second resistor, and another terminal of the constant current source is grounded; a turn-off slope of the current flowing through the LED load is adjusted through the first resistor, the second resistor and the constant current source.

4. The single-segment linear constant-power LED driving circuit according to claim 1, characterized in that the single-segment linear constant-power LED driving circuit further comprises a circuit for generating operating voltages, wherein the circuit for generating operating voltages provides an operating voltage for each module; one terminal of the circuit for generating operating voltages is connected to the output terminal of the voltage input module, and another terminal of the circuit for generating operating voltages is grounded through an energy storage capacitor.

5. A method for driving the single-segment linear constant-power LED driving circuit according to claim 1, characterized in that the method for driving the single-segment linear constant-power LED at least comprises the following steps:

turning on the power switch tube, wherein when an input voltage is greater than a turn-on voltage of the LED load, the LED load is turned on, and current flows through the LED load and the power switch tube; the current control module receives a sampling voltage and integrates the compensation capacitor to obtain a control signal; the control signal controls the power switch tube to limit a peak current flowing through the LED load so as to obtain a constant current average value in different input voltage periods;

the input voltage continues to increase, and when the voltage at the drain terminal of the power switch tube is greater than a set high voltage, the over-voltage control module outputs a turn-off signal to turn off the current flowing through the LED load, thereby reducing power consumption;

and then the input voltage drops; when the voltage at the drain terminal of the power switch tube is less than the set high voltage, the turn-off signal is disabled, current flows through the LED load and the power switch tube, and a current average value is kept constant in different input voltage periods; and the input voltage continues to drop, and when the input voltage is less than the turn-on voltage of the LED load, the LED load is turned off, and no current flows through the LED load and the power switch tube.

6. The method for driving the single-segment linear constant-power LED according to claim 5, characterized in that the turn-off slope of the current flowing through the LED load is set by setting a dropping point and a turn-off point of the current flowing through the LED load, thereby reducing electromagnetic interference.

7. The method for driving the single-segment linear constant-power LED according to claim 6, characterized in that the voltage at the drain terminal of the power switch tube is detected; when the detected voltage is greater than zero, the current flowing through the LED load begins to drop; when the detected voltage is greater than a reference voltage, the current flowing through the LED load is turned off.

8. The method for driving the single-segment linear constant-power LED according to claim 7, characterized in that when the detected voltage is greater than zero, the voltage at the drain terminal of the power switch tube is I1*R1, wherein I1 refers to constant current of the constant current source, and R1 refers to a resistance of the first resistor.

9. The method for driving the single-segment linear constant-power LED according to claim 7, characterized in that when the detected voltage is greater than the reference voltage, the voltage at the drain terminal of the power switch tube is (Vref/R2+I1)*(R1+R2), wherein Vref refers to the reference voltage, I1 refers to constant current of the constant current source, R1 refers to a resistance of the first resistor, and R2 refers to a resistance of the second resistor.

* * * * *